United States Patent Office 2,821,459
Patented Jan. 28, 1958

2,821,459

METHOD OF DRYING LATEX-SPUN PRODUCTS

John W. Morris, Jr., Bay City, Mich., assignor to The Dow Chemical Company, Midland, Mich., a corporation of Delaware No Drawing. Application June 17, 1955
Serial No. 516,331

4 Claims. (Cl. 18—54)

This invention relates to a method of drying or desolvating latex-spun products. More particularly it relates to a method of drying or desolvating articles made by wet spinning a latex of a normally crystalline vinylidene chloride polymer.

Normally crystalline vinylidene chloride polymers, including copolymers, have been widely used in the production of films, filaments, and fibers. In the past such articles have been made usually by melt extrusion processes, but with the advent of stable aqueous latexes of such polymers, latex processes for making the articles have been investigated. In some of the more promising of those processes the latex is brought into contact with a suitable coagulant under special conditions to produce the desired article. However, after the local coagulation has occurred the water of the latex is still present in the article making it weak and difficult to handle. Drying such a weak article to make it easier to handle in subsequent operations is troublesome.

It would therefore be desirable to have and it is a principal object of this invention to provide a method of drying a freshly coagulated article prepared from an aqueous latex.

The above and related objects are accomplished by a method of floating the freshly coagulated article on the surface of a bath of a liquid non-solvent for the polymer held at a temperature of from 100° to 175° C. but which is below the softening range of the polymer.

The method of the invention may be employed with any polymer latex capable of being coagulated into a continuous article. It is especially well adapted for the latexes of the normally crystalline vinylidene chloride polymers, including the copolymers of at least 70 percent vinylidene chloride with another monoethylenic copolymerizable monomer such as vinyl chloride, vinyl acetate, or vinyl cyanide.

The method is well suited to be included as a step in the production of continuous fibers, filaments, and films. Such production usually includes the steps of expressing either the latex or the coagulant through a suitably shaped nozzle into a bath of coagulant or latex, respectively, then washing the partly coagulated article to remove coagulant, then drying, followed by heating to the fusion point to destroy any crystallinity in the article, after which the article is cooled and oriented. The method of this invention may follow the washing step and precede the fusion step. Thus, any water in the interior of the partially coagulated article is effectively removed before the surface drying causes the formation of a hard outer shell or surface which would trap the water inside the article and prevent its removal.

There are certain requirements for the liquid in the nonsolvent heating bath which are necessary for the operation of the method. The boiling point must be above 100° C. for the most efficient removal of water. The surface tension of the liquid must be low enough to wet the polymeric article so that fibers and filamentary articles will not be drawn together causing adhesion. The density of the liquid must be great enough that the coagulated polymeric articles will float. In addition, the liquid must not be a solvent for the particular polymer employed. It is desirable but not necessary that the liquid be watermiscible so that the water may be removed from the coagulated article and readily carried away both by evaporation and by extraction. As typical examples of useful liquids may be mentioned glycerine and propylene glycol.

When articles are prepared by expressing a latex through a die orifice into a coagulating bath, partial coagulation occurs producing a tacky porous article having the approximate shape and dimensions of the article desired. The coagulant is present on the surface and within the porous structure of the article making the article very weak and difficult to handle without breakage, particularly during the subsequent orientation steps. It is necessary that the porous article be washed to remove the coagulant since most coagulants are electrolytes which have a deleterious effect on the polymer. After washing, the articles remain very weak since water is still present in the porous structure. The articles are likewise quite tacky so that drying several of them together, as in the case of multifilament manufacture, causes them to adhere to each other, making the finished product relatively useless. When the method of this invention follows the washing step, the water is removed from the porous structure by dissolution and evaporation, making the articles easier to handle without breakage or adherence.

The operation of the process will be more clear from the following illustrative example.

*Example*

An aqueous latex of a copolymer prepared from a monomeric material consisting of 97 percent vinylidene chloride and 3 percent vinyl cyanide was prepared and expressed through a spinneret into an electrolytic coagulating bath. The partially coagulated filaments were then led through an aqueous bath to wash the coagulant out of the filaments. The filaments were then drawn across the surface of a glycerine bath at a temperature of 100° C., after which they were heated to their fusion temperature near 180° C., supercooled to below 80° C., and oriented. There were no breaks in the handling operations nor did any of the filaments adhere to each other. The filaments had tenacities of several grams per denier.

When the bath consisted of propylene glycol at 145° C. the same beneficial results were obtained.

By way of contrast, when the above method was repeated omitting the non-solvent bath, and drying instead on a conveyor belt under infrared lamps, the fibers were very weak causing several breaks and several fibers adhered to each other, making a non-uniform filamentary product. The fibers had tenacities of the order of 0.5 to 2 grams per denier.

I claim:

1. In a method for producing continuous thin oriented articles from aqueous latexes of normally crystalline polymers comprising the steps of extruding a latex into an electrolyte coagulant to coagulate the latex to form a continuous thin article, washing the so-formed article, and drying and then orienting it by stretching, the improvement consisting of advancing the washed but undried article across the surface of a heated liquid bath of an organic, water-miscible material which wets but is a non-solvent for said polymer and whose boiling point at atmospheric pressure is at least 100° C., and which has a density such that said polymeric article may be floated thereon, the temperature of said bath being at least 100° C., but below the softening point of the polymer, and thereafter fusing, cooling and stretching the article to effect orientation.

2. The method as claimed in claim 1 wherein the polymer is a copolymer of at least 70 percent vinylidene chloride with another copolymerizable monoethylenically unsaturated monomer.

3. The method as claimed in claim 2, wherein the bath is glycerine.

4. The method as claimed in claim 2, wherein the bath is propylene glycol.

References Cited in the file of this patent

UNITED STATES PATENTS

| | | |
|---|---|---|
| 1,801,263 | Burnette | Apr. 21, 1931 |
| 2,530,362 | Morris | Nov. 14, 1950 |
| 2,680,084 | Ryan | June 1, 1954 |
| 2,737,436 | Boeuf | Mar. 6, 1956 |